US006448752B1

United States Patent
Umemoto

(10) Patent No.: US 6,448,752 B1
(45) Date of Patent: Sep. 10, 2002

(54) SWITCHING REGULATOR

(75) Inventor: Kiyotaka Umemoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/987,874

(22) Filed: Nov. 16, 2001

(30) Foreign Application Priority Data

Nov. 21, 2000 (JP) ........................................ 2000-354250

(51) Int. Cl.[7] ................................................ G05F 1/40
(52) U.S. Cl. ........................ 323/288; 323/284; 327/131
(58) Field of Search ................................. 323/282, 284, 323/288, 349, 351; 327/131, 132

(56) References Cited

U.S. PATENT DOCUMENTS 5,850,137 A * 12/1998 Takimoto et al. ........... 320/164
6,194,936 B1 * 2/2001 Yama ......................... 327/175

* cited by examiner

Primary Examiner—Bao Q. Vu
Assistant Examiner—Gary L. Laxton
(74) Attorney, Agent, or Firm—Mattingly, Stanger & Malur

(57) ABSTRACT

In the present invention, an amplitude of a triangular wave from a triangular wave generating circuit is controlled depending on a power source voltage and further the current value for charging and discharging a capacitor is also controlled depending on the amplitude in such a manner that when the power source voltage drops the frequency of the triangular wave to be outputted is maintained at a predetermined frequency by reducing the current value and the amplitude and the waveform gradient is reduced. Accordingly, a variation range of PWM pulse width can be enlarged with respect to the variation of error voltage and a sufficient control capacity can be achieved with respect to the output voltage variation when the power source voltage drops.

8 Claims, 3 Drawing Sheets

SWITCHING REGULATOR

BACKGROUND OF THE INVENTION

1. Field of the Invention

The present invention relates to a switching regulator, and, more specifically, relates to a PWM drive switching regulator driven by a battery power source in which reduction of PWM drive capacity at the time of power source voltage drop is suppressed and a predetermined duty ratio at the time of power source voltage drop is ensured as well as even if the power source voltage drops to a certain degree, a voltage stabilizing control with respect to a variation of an output voltage can be performed.

2. Background Art

Conventionally, for a portable type audio device and a portable type electronic device such as a personal computer, a PHS, a portable telephone set and a PDA, in order to efficiently covert electric power and to obtain a predetermined power source voltage a DC/DC converter making use of a switching regulator as been utilized.

FIG. 3 shows an example of these sorts of witching regulators (DC/DC Converter).

Numeral 10 is a switching regulator, 11 an error amplifier (Err) thereof, 12 a reference voltage generating circuit, 13 a PWM pulse generating circuit, 14 a driver. 15 is a switching circuit in a form of series circuit of a P channel MOSFET transistor Q and a Schottky diode D which is provided between a power source line +Vcc (DC power source voltage at the input side) and the ground GND.

16 is an output terminal thereof, and between the output terminal 16 and the ground GND a power use capacitor C is provided and a coil L is connected between the junction of the transistor Q and the Schottky diode D and the output terminal 16. Herein, as the coil L a coil having a reactance, for example, of about 10 $\mu$H is used and as the capacitor C a capacitor having a capacitance, for example, of about 150 $\mu$F is used. Further, between the output terminal 16 and the ground GND a resistance type voltage dividing circuit 17 used for output voltage detection is provided, and voltage Vs detected by the resistance type voltage dividing circuit 17 is fed back to the error amplifier 11. The detection voltage Vs is compared at the error amplifier 11 with a comparison reference voltage Vref of the reference voltage generating circuit 12, and an error voltage (error detection signal) Ve depending on the comparison result is inputted to the PWM pulse generating circuit 3.

The resistance type voltage dividing circuit 17 used for the output voltage detection is provided with a series circuit of resistors R1 and R2 and in parallel therewith a speed-up circuit (a circuit for shortening time for moving into an operating condition from a start). The speed-up circuit is constituted by a CR time constant circuit 17a used for gain setting.

The error amplifier circuit (Err) 11 includes a phase correction circuit 18 which is constituted by a series circuit of a capacitor C1 and a resistor R3 and a capacitor C2 provided in parallel with the series circuit, and of which circuit is provided between the output and one of the input thereof as a feedback circuit, thereby, the oscillation of the circuit is prevented, when a PWM drive gain rises.

The PWM pulse generating circuit 13 compares the waveform of a triangular wave generating circuit 13b at a comparator 13a with the error voltage (the voltage depending on the comparison result) Ve and produces a PWM pulse by slicing the triangular wave with the error voltage Ve. The PWM pulse is then applied to the driver 14. The driver 14 turns ON/OFF the transistor Q depending on the pulse width thereof and generates a stepped down voltage (in case of a stepped up type, a stepped up voltage by means of a fly-back pulse) at the output terminal 16.

The Schottky diode D is a fly wheel diode to which the current flown out from the coil L when the transistor Q is turned OFF is commutated.

Thereby, in the switching regulator 10, the transistor Q is ON/OFF controlled so that the voltage divided by the resistance type voltage dividing circuit 17 coincides with the comparison reference voltage Vref and the output voltage generated at the output terminal 16 is controlled to assume a constant voltage Vo representing a target, and thus the output voltage is stabilized.

Further, as the power source (Vin=power source voltage+ Vcc) at the input side which is connected to the power source line +Vcc as a power supply source a battery as shown by dotted lines is usually used.

However, in such circuit, although the amplitude $\Delta$V (see FIG. 4) of the triangular wave of the triangular wave generating circuit 13a varies in the direction in which the amplitude slightly reduces in response to a power source voltage drop, however, with this measure the stabilizing control at the time of power source voltage drop can not be performed. Since the phase correction by the phase compensation circuit is set in correspondence with the power source voltage under a normal condition, such a PWM control is required in which the ON period of an output transistor is, for example, set at more than 80% so as to stabilize the output voltage at the time of power source voltage drop.

When performing such PWM control, as seen from a relationship between the waveform of the triangular wave and the error voltage Ve in the PWM control as shown in FIG. 4, the duty ratio of the PWM drive pulse rises and a control is performed near at the bottom of the triangular wave T. For this reason, the variation range of the pulse width with respect to the variation of the error voltage Ve is suppressed and limited and causes a problem which prevents a control in response to an output voltage variation at the time of power source voltage drop.

Further, in FIG. 4 abscissa represents amplitude voltage value of the triangular wave and ordinate represents time t.

SUMMARY OF THE INVENTION

An object of the present invention is to resolve the above conventional art problems and to provide a switching regulator in which reduction of PWM drive capacity at the time of power source voltage drop of the switching regulator is suppressed and a predetermined duty ratio at the time of power source voltage drop is ensured as well as even if the power source voltage drops to a certain degree, a voltage stabilizing control with respect to a variation of an output voltage can be performed.

A switching regulator of the present which achieves the above object and which receives an electric power from a DC power source having a predetermined power source voltage, generates an error voltage depending on difference between an output voltage and a target voltage, produces a PWM drive pulse through comparison of the error voltage with a triangular wave having a specific frequency from a triangular wave generating circuit and controls the output voltage so as to assume the target voltage, by switching a transistor with the PWM drive pulse, is characterized in that the triangular wave generating circuit includes a capacitor for charging and discharging; an amplitude voltage generating circuit which generates a triangular wave amplitude voltage in response to the power source voltage; a charging and discharging current producing circuit which produces current having a current value corresponding to the amplitude voltage as a charging and discharging current for the capacitor and a charging and discharging control circuit which receives the amplitude voltage and changes over the current from the charging and discharging current producing circuit from charging to discharging or from discharging to charging according to the amplitude voltage, and generates the triangular wave having the specific frequency as a terminal voltage of the capacitor.

According to the above structure, the amplitude of the triangular wave from the triangular wave generating circuit is controlled so as to be reduced depending on the drop of the power source voltage and further the current value for charging and discharging the capacitor is also controlled so as to be reduced depending on the amplitude. Through maintaining the frequency of the triangular wave to be outputted at a predetermined frequency by reducing the current value for charging and discharging together with the amplitude when the power source voltage drops, the gradient of the triangular waveform can be reduced. Through the reduction of the gradient of the waveform of the triangular wave, the error voltage is shifted from the bottom portion of the voltage of the triangular wave toward the center side thereof and the required comparison is performed.

Further, although a battery is usually used as the power source, however, the power source is not limited thereto and in the DC power source generally the power source voltage is substantially the constant. Accordingly, the voltage amplitude of the triangular wave generated in response to the power source voltage is kept substantially constant. The charging and discharging current for the capacitor in response to the voltage amplitude also assumes substantially constant current. Therefore, the generated triangular wave takes a waveform having a linear gradient.

Accordingly, a variation range of the PWM pulse width can be enlarged with respect to the variation of the error voltage and a sufficient control capacity can be achieved with respect to the output voltage variation when the power source voltage drops.

As a result, a reduction of PWM drive capacity can be suppressed when the power source voltage drops in the switching regulator which is driven by a battery power source, a predetermined duty ratio can be ensured even at the time when the power source voltage drops, and a PWM drive can be realized sufficiently with respect to the output voltage variation when the power source voltage drops.

DESCRIPTION OF THE PREFERRED EMBODIMENT

Figure 1:
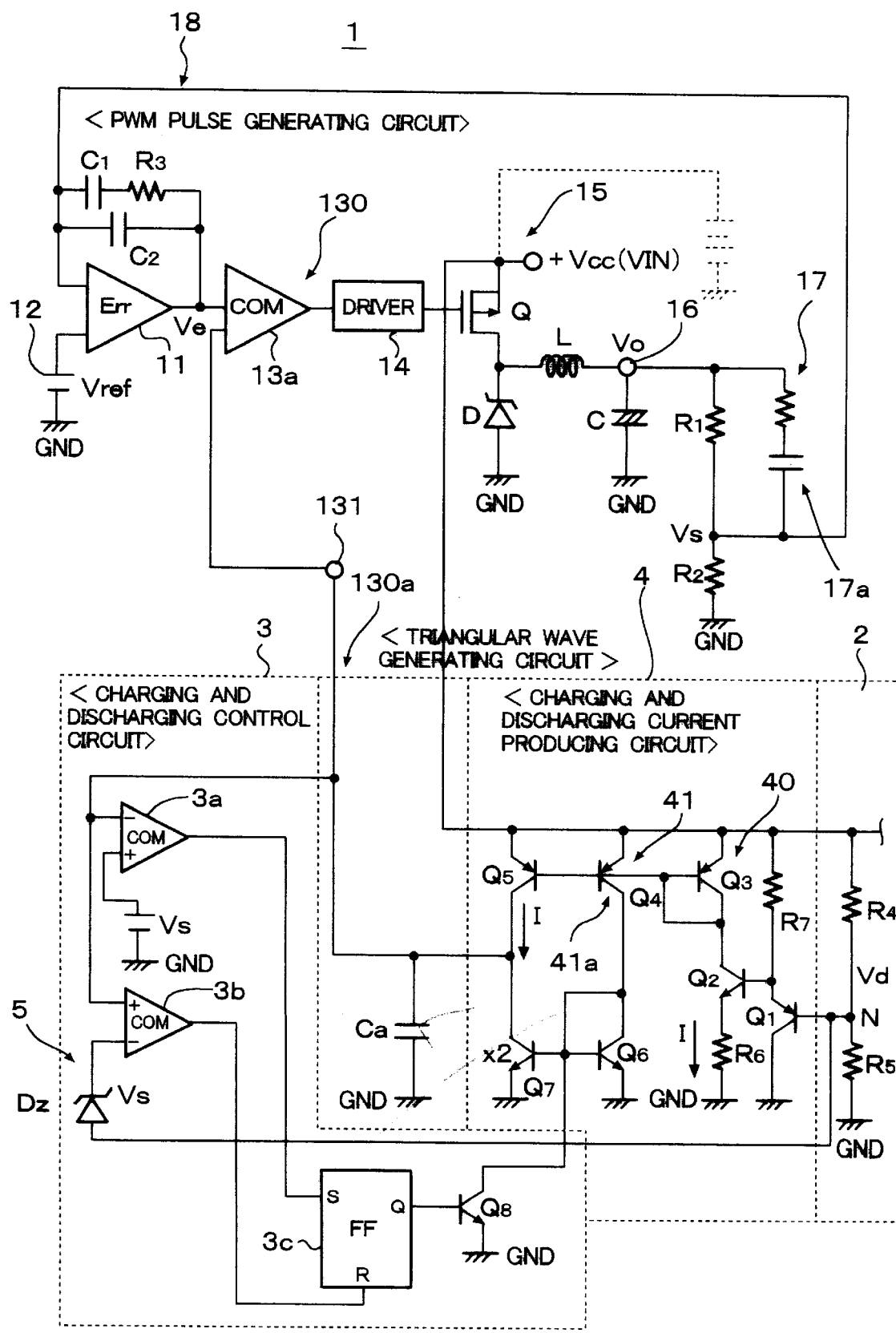
FIG. 1 is a block diagram of an embodiment to which a switching regulator according to the present invention is applied.
Figure 2:
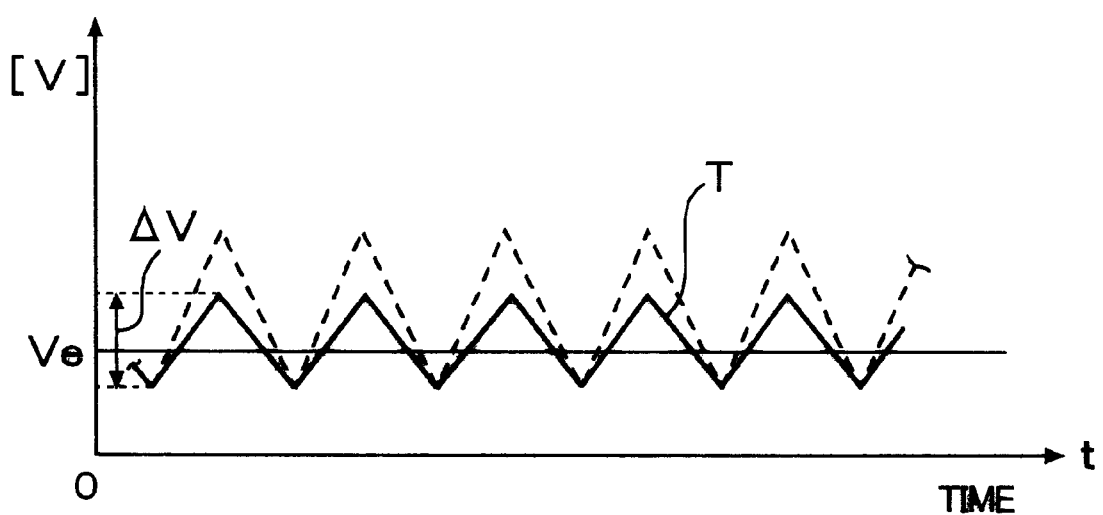
FIG. 2 is a view for explaining a relationship between waveform of triangular waves from a triangular wave generating circuit and error voltage in PWM control in the embodiment.
Figure 3:
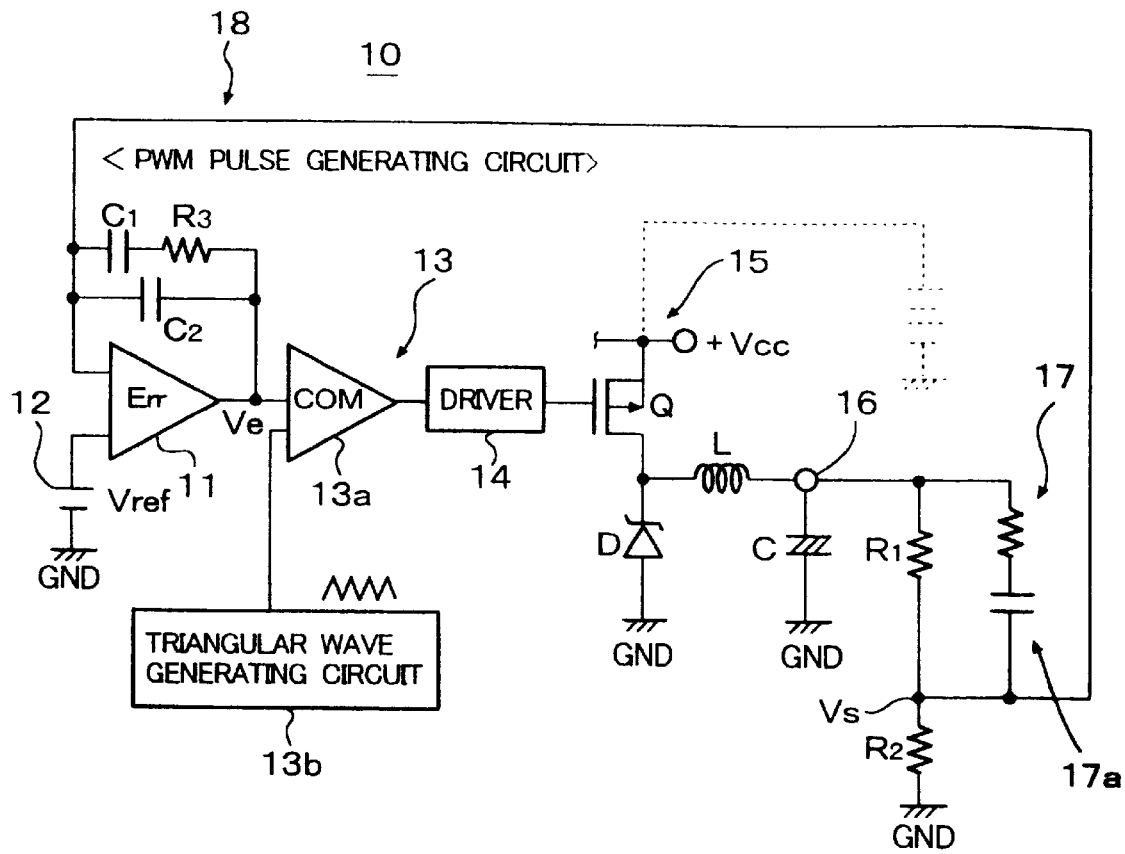
FIG. 3 is a block diagram showing an example of conventional switching regulators.
Figure 4:
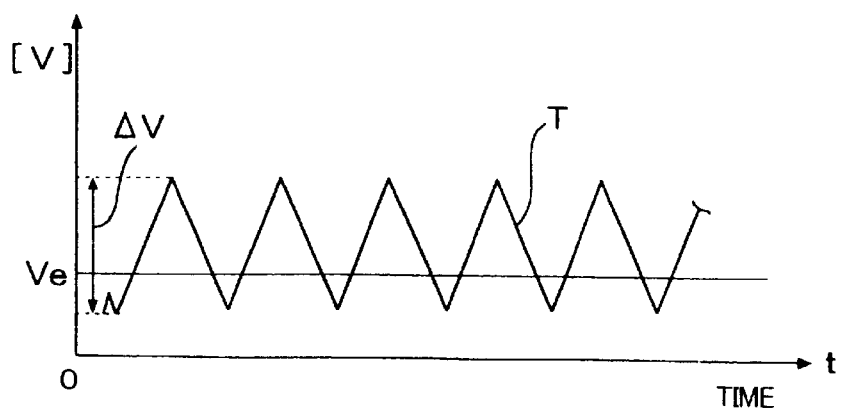
FIG. 4 is a view for explaining a relationship between output waveform from a triangular wave generating circuit and PWM control in the example.

In a switching regulator (DC/DC converter) 1 in FIG. 1, a PWM pulse generating circuit 130 having a triangular wave generating circuit 130a is provided in place of the triangular wave generating circuit 13b in FIG. 3. The triangular wave generating circuit 130a is a circuit which is designed to vary and reduce the amplitude of a triangular wave and the gradient of the gradient portion the triangular wave waveform in response to drop in the voltage (an input power source voltage) Vin of a battery, reduces a PWM duty ratio to about 60%~70% and generates a triangular wave having an amplitude corrected so that the position of the error voltage Ve is to be proper with respect to the triangular wave. The generated triangular wave is outputted to a comparator 13a. Thereby, the relationship between the error voltage Ve and the generated triangular wave in the PWM control can be set at a proper position. Further, in FIGS. 1 and 2 the same constitutional elements as in FIGS. 3 and 4 are designated by the same reference numerals and the explanation thereof is omitted.

The triangular wave generating circuit 130a is constituted by a resistance type voltage divider circuit 2 for amplitude setting use which generates a voltage amplitude of a triangular wave in response to a voltage +Vcc of a power source line +Vcc, a charging and discharging control circuit 3, a charging and discharging current producing circuit 4, a constant voltage circuit 5 including a zener diode Dz and a capacitor Ca for charging and discharging use, and an output thereof is taken out from a terminal of the capacitor Ca.

The resistance type voltage divider circuit 2 is constituted by a series circuit of resistors R4 and R5, is provided between the power source line +Vcc (=Vin) and the ground GND and divides the power source voltage +Vcc to generate detection voltage Vd at a dividing point N.

The charging and discharging control circuit 3 is constituted by comparators 3a and 3b, a flip-flop 3c and an NPN transistor Q8, and the comparator 3a receives at (+) input a reference voltage Vs and at (−) input the charging voltage of the capacitor Ca and compares the terminal voltage (charging voltage) of the capacitor Ca with the reference voltage Vs to detect charging start voltage. The comparator 3b receives at (+) input the terminal voltage (charging voltage) of the capacitor Ca and at (−) input the detection voltage Vd via the constant voltage circuit 5 (constant voltage Vs) and compares the charging voltage of the capacitor Ca with the reference voltage Vs+Vd to detect discharging start voltage.

The detection output of the comparator 3a is generated when the charging voltage of the capacitor Ca is equal to or less than the reference voltage Vs and is inputted to a set side terminal S of the flip-flop 3c to cause a Q output at HIGH level (hereinbelow will be indicated as "H"). The detection output of the comparator 3b is generated when the charging voltage of the capacitor Ca is equal to or more than the reference voltage Vs+Vd and is inputted to a reset side terminal R of the flip-flop 3c to cause the Q output at LOW level (hereinbelow will be indicated as "L").

The Q output of the flip-flop 3c is inputted to a base of the transistor Q8 of which emitter is connected to the ground GND and at which collector a charging and discharging change-over signal is generated. Although the control of the transistor Q8 will be explained later, the charging and discharging signal from the transistor Q8 is inputted to the charging and discharging current producing circuit 4 and causes to charge the capacitor Ca with charging current of a predetermined value I when the Q output is "H" and to discharge the capacitor Ca with discharging current of a predetermined value I when the Q output is "L".

As a result, the voltage of the triangular wave generated by the charging and discharging the capacitor Ca covers from voltage Vs to voltage Vs+Vd and the amplitude ΔV thereof corresponds to the voltage Vd.

Therefore, when the voltage of the power source line +Vcc drops, the amplitude ΔV of the triangular wave reduces accordingly.

The charging and discharging current producing circuit 4 receives the detection voltage coinciding with the voltage amplitude ΔV of the triangular wave and varies the same depending on the power source voltage by varying the charging and discharging current value I depending on the detection voltage Vd. Namely, when the power source voltage drops, in other words, when the amplitude ΔV of the triangular wave reduces, the charging and discharging current value I is reduced depending on the voltage amplitude ΔV of the triangular wave. Thereby, an angle of the gradient portion of the generated triangular wave is reduced.

The charging and discharging current producing circuit 4 is constituted by a voltage amplitude/current conversion circuit 40 and a charging and discharging current value transferring circuit 41. The voltage amplitude/current conversion circuit 40 is constituted by a PNP transistor Q1 for initial stage input and an NPN transistor which is provided as a voltage current conversion circuit having a resistor R6 at the emitter side thereof and forms an emitter follower circuit. The charging and discharging current value transferring circuit 41 is constituted by PNP transistors Q3, Q4 and Q5 which form a current mirror circuit 41a provided at the up-stream side of the NPN transistor Q2 and NPN transistors Q6 and Q7 which form a current mirror circuit 41b at the down-stream side of the PNP transistors Q4 and Q5.

The emitter side of transistor Q1 is connected via a resistor R7 to the power source line +Vcc and the collector side thereof is connected to the ground GND. When the transistor Q1 receives the detection voltage Vd at the base thereof, the transistor Q1 generates at the emitter thereof voltage Vd+1Vf (wherein 1 Vf is forward voltage drop between base and emitter). The emitter side of the transistor Q2 is connected to the ground GND via a resistor R6, the collector side thereof is connected to the power source line +Vcc via the collector and emitter of the transistor at the input side of the current mirror circuit 41a and the base thereof is connected to the emitter of the transistor Q1. Thus, the base thereof receives the voltage Vd+1 Vf. Thereby, at the terminal of the resistor R6 voltage Vd+1 Vf−1 Vf (=Vd) is received which is equal to the amplitude ΔV of the triangular wave. As a result, the detection voltage Vd is converted by the resistor R6 to a current value I (=Vd/R6). Wherein R6 is the resistance value of the resistor R6.

The current having value I is applied to the collector of the input side transistor Q3 in the current mirror circuit 41a to form a drive current which is transferred to the output side transistors thereof. Then, the same is outputted to the down-stream transistors Q6 and Q7. Further, the emitter sides of the transistors Q3, Q4 and Q5 are connected to the power source line +Vcc. The collector of the transistor Q4 is connected to the ground GND via the collector and emitter of the transistor Q6, and the collector of the transistor Q5 is connected to the ground GND via a collector and emitter of the transistor Q7. The output current of value I flows as it is to the ground GND via the collector-emitters of the transistors Q6 and Q7 when the transistor Q6 is in ON state.

Herein, since the emitter area of the output side transistor Q7 in the current mirror circuit 41b is selected twice larger than that of the input side transistor Q6, the transistor Q7 has a capacity to cause to flow current of value 2I, when current of value I flows through the transistor Q6. The base of the input side transistor Q6 is connected to a control transistor Q8 in the charging and discharging control circuit 3 to thereby control ON/OFF thereof. The base of the transistor Q8 receives the Q output of the flip-flop 3c in the charging and discharging control circuit 3. The emitter thereof is connected to the ground GND. Thereby, when the Q output is "H", the transistor Q8 is turned ON and the transistor Q6 is turned OFF. When the transistor Q6 is in OFF state, the transistor Q7 is turned OFF and the current of value I in the up-stream transistor Q5 flows into the capacitor Ca to charge the same with charging current of value I.

On the other hand, when the Q output is "L", the transistor Q8 is turned OFF and the transistor Q6 is turned ON. When the transistor Q6 is in ON state, since the transistor Q7 can cause to flow current of value 2I, current of value I from the up-stream transistor Q5 and discharge current of value I from he capacitor Ca flow out. Thereby, the discharging of the current of value I is effected.

As a result, the amplitude ΔV of the triangular wave generated by the triangular wave generating circuit 130a is given as;

$$\Delta V = R5 \cdot Vcc/(R4+R5)=(Vd),$$

and the charging and discharging current value I is given as;

$$I = \Delta V/R6$$

Further, with regard to the frequency f of the outputted triangular wave, since Ca·V=I·t and f=½t, t=Ca·V/I=Ca·ΔV/(ΔV/R6), thereby, the frequency f is expressed as;

$$f = 1/(2Ca \cdot R6)$$

wherein R4, R5 and R6 are resistance values of the resistors R4, R5 and R6, and Ca is a capacitance value of the capacitor Ca.

Accordingly, the frequency f of the triangular wave is kept invariable and constant even when the amplitude ΔV varies due to variation of the power source voltage.

Further, the current value I which is determined by the resistance value of the above resistor R6 and the voltage Vd is selected in such a manner that when the power source voltage +Vcc drops below a predetermined value in relation to the capacitance of the capacitor Ca, the PWM duty ratio is kept at about 60%~70%.

As a result, a triangular wave with frequency f and amplitude ΔV as shown in FIG. 2 is formed, and when the amplitude ΔV reduces because of power source voltage drop, the gradient angle of the triangular wave likely reduces, thereby, the frequency f is substantially kept invariable.

The relationship between the detection voltage Vd and the amplitude ΔV is kept proper one through the drop of duty ratio even if the power source voltage drops. Further, the waveform indicated by dotted lines corresponds to the conventional waveform of triangular wave when the power source voltage drops as shown in FIG. 3, and the duty ratio thereof is high in comparison with the triangular wave as shown by the solid line.

In the embodiment as has been explained above, the charging and discharging current of value I produced by the current mirror circuits is transferred to the capacitor, however, the current transfer is not limited from such current mirror circuits.

What is claimed is:

1. A switching regulator which receives an electric power from a DC power source having a predetermined power source voltage, generates an error voltage depending on difference between an output voltage and a target voltage, produces a PWM drive pulse through comparison of the error voltage with a triangular wave having a specific frequency from a triangular wave generating circuit and controls the output voltage so as to assume the target voltage, by switching a transistor with the PWM drive pulse, characterized in that the triangular wave generating circuit includes a capacitor for charging and discharging; a amplitude voltage generating circuit which generates a triangular wave amplitude voltage in response to the power source voltage; a charging and discharging current producing circuit which produces current having a current value corresponding to the amplitude voltage as a charging and discharging current for the capacitor and a charging and discharging control circuit which receives the amplitude voltage and changes over the current from the charging and discharging current producing circuit from charging to discharging or from discharging to charging according to the amplitude voltage, and generates the triangular wave having the specific frequency as a terminal voltage of the capacitor.

2. A switching regulator according to claim 1, wherein the DC power source is a battery, the current having the current value corresponding to the amplitude voltage is a constant current and the charging and discharging current producing circuit includes a resistor which receives the amplitude voltage from the amplitude voltage generating circuit and converts the amplitude voltage into the current having the current value and a current mirror circuit which generates a current having the current value depending on the current flowing through the resistor as the constant current.

3. A switching regulator according to claim 2, wherein the charging and discharging control circuit includes a first comparator which receives a reference voltage and compares the terminal voltage of the capacitor with the reference voltage, a second comparator which receives a voltage equal to the sum of the amplitude voltage and the reference voltage and compares the terminal voltage of the capacitor with the summed voltage and a control circuit which receives the comparison result of the first and second comparators and outputs a charging and discharging change-over signal to the charging and discharging current producing circuit.

4. A switching regulator according to claim 3, wherein the first comparator generates a first detection signal when the terminal voltage of the capacitor is equal to or less than the reference voltage, the second comparator generates a second detection signal when the terminal voltage of the capacitor is equal to or more than the sum of the amplitude voltage and the reference voltage, with the first detection signal the constant current produced by the charging and discharging current producing circuit is caused to be flown out as a charging current from the charging and discharging current producing circuit to the capacitor and with the second detection signal the constant current is caused to be flown out as a discharging current from the capacitor to the charging and discharging current producing circuit.

5. A switching regulator according to claim 4, wherein the amplitude voltage generating circuit is a resistance type voltage divider circuit provided between the power source line of the battery and the ground and generates a divided voltage as the amplitude voltage, and the charging and discharging current producing circuit includes an emitter follower circuit which is provided at the emitter thereof with the resistor for converting the amplitude voltage into the current having the current value and drives the current mirror circuit with the current converted by the resistor.

6. A switching regulator according to claim 5, wherein charging and discharging current producing circuit further includes a flip-flop, the flip-flop receives the first detection signal as a set signal and the second detection signal as a reset signal, generates a charging and discharging change-over signal and sends out the same to the charging and discharging current producing circuit.

7. A switching regulator according to claim 6, wherein the transistor is provided between the power source line of the battery and the ground and further includes an error voltage detection circuit, a third comparator and a driver, the error voltage detection circuit generates the error voltage, the third comparator receives the error voltage and the terminal voltage of the capacitor and generates a PWM pulse through comparison of these voltages and the driver receives the PWM pulse and generates the PMW drive pulse for switching the transistor.

8. A switching regulator according to claim 7, further comprises a reference voltage generating circuit which generates a reference voltage having a specific relation with respect to the target voltage and a smoothing circuit, wherein the error voltage detection circuit generates the error voltage depending on the difference between the reference voltage of the reference voltage generating circuit and the predetermined detection voltage following the output voltage and the smoothing circuit receives the output of the transistor and outputs an electric power having the output voltage.

* * * * *